(12) United States Patent
Lin et al.

(10) Patent No.: US 9,471,808 B2
(45) Date of Patent: Oct. 18, 2016

(54) FILE MANAGEMENT SYSTEM AND METHOD

(71) Applicants: INWELLCOM TECHNOLOGY CO., LTD., Taipei (TW); Jian-Jr Lin, Taipei (TW)

(72) Inventors: Jian-Jr Lin, Taipei (TW); Ke-Sen Huang, Taipei (TW)

(73) Assignees: INWELLCOM TECHNOLOGY CO., LTD., Taipei (TW); Jian-Jr Lin, Taipei (TW)

(*) Notice: Subject to any disclaimer, the term of this patent is extended or adjusted under 35 U.S.C. 154(b) by 95 days.

(21) Appl. No.: 14/556,418

(22) Filed: Dec. 1, 2014

(65) Prior Publication Data

US 2015/0169896 A1  Jun. 18, 2015

(30) Foreign Application Priority Data

Dec. 17, 2013  (TW) .............................. 102146557 A

(51) Int. Cl.
G06F 21/31 (2013.01)
G06F 21/62 (2013.01)
H04L 29/06 (2006.01)

(52) U.S. Cl.
CPC ........... *G06F 21/6227* (2013.01); *G06F 21/31* (2013.01); *H04L 63/083* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,976,165 B1* | 12/2005 | Carpentier | .......... | G06F 17/3061 380/241 |
| 7,260,555 B2* | 8/2007 | Rossmann | .......... | G06F 21/6209 705/50 |
| 8,745,384 B2* | 6/2014 | Persaud | ................ | G06F 21/606 713/165 |
| 8,863,305 B2* | 10/2014 | Okada | ................. | G06F 21/6209 726/21 |
| 9,129,120 B2* | 9/2015 | Garcia | ................ | G06F 21/6209 |
| 2003/0196114 A1* | 10/2003 | Brew | ...................... | G06F 21/10 726/1 |
| 2005/0204008 A1* | 9/2005 | Shinbrood | ............ | H04L 12/584 709/206 |
| 2010/0322079 A1 | 12/2010 | Kitazoe et al. | | |
| 2011/0200224 A1 | 8/2011 | Kamperman | | |

FOREIGN PATENT DOCUMENTS

| | | |
|---|---|---|
| CN | 101170554 A | 4/2008 |
| CN | 102185695 A | 9/2011 |
| TW | M272149 U | 8/2005 |
| TW | M390620 U1 | 10/2010 |
| TW | 201140369 A1 | 11/2011 |

* cited by examiner

*Primary Examiner* — Beemnet Dada
(74) *Attorney, Agent, or Firm* — patenttm.us

(57) ABSTRACT

A file management system comprises an identification device, an administration device, and a supervisory device. A first computing processor of the administration device generates an encrypted file from an original file and encryption information, and stores the encryption information into the identification device. The first computing processor further defines file management information for access control of the encrypted file, and the first computing processor also stores the file management information into the identification device. A second processor of the supervisory device loads the encryption information and the file management information in the identification device to control the usage of the encrypted file. The second computing processor further records the file usage information into the identification device, and transmits to the administration device. The file management system also records the file usage information for clarifying the responsibility of disclosing the content of the encrypted files.

37 Claims, 5 Drawing Sheets

FILE MANAGEMENT SYSTEM AND METHOD

BACKGROUND OF THE INVENTION

1. Field of the Invention

The present invention is related to a file management system and method, particularly for the system and method of using file encryption technologies, applying file access control to the encrypted files, and recording the corresponding file usage information.

2. Description of the Related Art

With the development of Internet and portable devices (e.g., USB pen drive, mobile phone, and so on.), electronic files (e.g., Microsoft Word, Adobe PDF, and so on) become more and more popular and convenient for information delivery. Instead of exchanging or transmitting files via humans and transportations, the information delivery duration is significantly reduced by transmitting the electronic files via Internet and portable devices.

Besides, the electronic files may be uploaded to an Internet hard drive by their owner, and these files can be downloaded anywhere when the owner can connect to the Internet hard drive via the Internet. However, a cracker will have a chance to download the electronic files from the Internet hard drive and transmit the downloaded files to anyone without an agreement of the owner.

In many enterprises, files are generally stored in electronic form and some of these electronic files may contain confidential information, such as architectural drawings of the construction industry, electronic circuit diagrams of the IC design house, source codes of the software design house, songs and commercial content of the cultural and creative industry, and personal information of the financing industry. Once the computers used to store these confidential files are hacked, the confidential files may be transmitted arbitrarily to other people by the cracker. The above cases always have a great damage on the corporation's CI (Corporate Image), goodwill, and revenue.

Furthermore, as comparing the usages of electronic files and conventional hardcopies on paper, the electronic files are easy to be duplicated and delivered. As a result, the hackers and competitors can easily retrieve the confidential content of electronic files via illegal methods, the owner of the electronic files cannot prevent and control damages caused by these security breaks in time.

The file encryption is the most common technique to protect the confidential information stored in the electronic files. When the owner transmits an encrypted file to a user, the user needs know that how to decrypt the encrypted file. Therefore, the encrypted file cannot be used by a user without knowing the password. In general, most of users use simple passwords to encrypt files. It leads to that the encrypted files can be easily hacked by the crackers. Furthermore, after getting the passwords, the user may arbitrarily use the encrypted file and transmit the encrypted file to other people without the agreement of the owner. When the encrypted file is disclosed to the public, it is hard to clarify the responsibility of disclosing the encrypted file.

Furthermore, when the encrypted file is transmitted to the user and the corresponding password is told to the user, the owner cannot control the usage of the encrypted file any more. Then, the corresponding password and content of the encrypted file may be disclosed by the user, so that the encrypted file is leaked. Thus, when the encrypted file is decrypted using the password, the user can edit or modify the content of the encrypted file and transmit the modified file with incorrect information to other people. Then information corresponded to the content of the encrypted file may be transmitted with incorrect information. Once someone get the password to decrypt the encrypted file, the owner cannot control the usage of the encrypted file, so that the encrypted file does not have confidential. In other words, when the owner transmits the encrypted file to the user, the owner cannot control where the encrypted file is transmitted or control time limitation of the encrypted file. Therefore, the protection technique of electronic files needs to be further improved by reducing the risk of file transmission and enhancing the security of the stored files.

SUMMARY OF THE INVENTION

An objective of the present invention is to propose a two-layer file management system and method for providing the protection of confidential files to both authorized and unauthorized users. The system encrypts the confidential files in the first layer. Therefore, only an authorized user can decrypt and use the protected file. Further, in the second layer, the file management system can control the operations of the protected file, such as limiting the number of times and duration of using the encrypted file, and the privileges of copying or transmitting the content of the encrypted file.

To achieve the above objective, the file management system consists of an identification device, an administration device, and a supervisory device.

The identification device is an electronic storage device, and can be selectively and electronically connected with the administration device or the supervisory device.

The administration device comprises a first computing processor. The first computing processor generates an encrypted file according to an original file and encryption information. It also generates file management information according to file access rules. The first computing processor further stores the encryption information and the file management information into the identification device.

The supervisory device comprises a second computing processor. The second computing processor loads the encryption information and the file management information from the identification device, and authenticates the encryption information. When the encryption information is authorized, the encrypted file can be accessed according to the file management information. When the encryption information is not authorized, the access of the encrypted file is forbidden.

Wherein, the identification device is selectively connected to the administration device or the supervisory device.

Further, the present invention provides the file management method, consisting of a file encryption procedure and a file decryption procedure, as follows.

In the file encryption procedure, file access control rules are determined at first. Then, file management information is established. Finally, an encrypted file is generated according to an original file and the encryption information.

Moreover, the file encryption procedure determines whether an identification device is electronically connected or not. If not, it returns to verify the connection of the identification device again. If the identification device is connected, the file management information and the encryption information are stored in the identification device.

In the file decryption procedure, at first, it determines whether an identification device is electronically connected. If not, it returns to verify the connection of the identification device again. When the identification device is electronically connected, the encryption information, stored in the identification device, is used to authenticate the encrypted file. If the authorization is failed, the file decryption procedure is halted. If the authorization is successfully, it is going to access the encrypted file according to the file access control rules.

The present invention provides a two-layer protection mechanism to protect the confidential files. In the first layer protection scheme, the encrypted file is generated according to the original file and the encryption information, and then the encryption information is stored in the identification device. The encrypted file is accessed via the identification device which stored in the encryption information. Determining the encryption information is decrypted according to the encryption information of the identification device when uses the encrypted file. In other words, the first layer protection scheme limits the encrypted file to be accessible only by an authorized user who has the identification device. The second layer protection scheme is setting the file access control rules to generate the file management information, and the file management information is stored into the identification device. When the encrypted file is used, the file access control rules can limit the use of an encrypted file. For example, the authorized user cannot copy the encrypted file, capture a screen shot, and transmit the encrypted file to another person who is not authorized for avoiding the content of the encrypted file being dispread maliciously. Thus, the second layer protection scheme is that when the authorized user uses the encrypted file, the owner can still control the usage of the encrypted file. Therefore, the usage of the encrypted file is expected by the owner.

When using the encrypted file generated by the file management system of the present invention, the identification device is required to decrypt the encrypted file. Further, the file management information stored in the identification device is used to control the usage of the encrypted file. With the two-layer protection mechanism, the content of the encrypted file cannot be dispread maliciously without the identification device. Therefore, even if the encrypted file is stolen by malicious and unauthorized users during the file transmission, the encrypted file still cannot be used due to the lack of the identification device. Furthermore, the identification device can control the usage of the encrypted file to increase the security level, significantly. For example, copying the encrypted file is forbidden, the usage time of the encrypted file is limited, the number of printings of the encrypted file is also limited, a watermark is added when the content of the encrypted file is displayed or printed, and the transmission of the encrypted file via Internet is prohibited.

In practice, the encrypted file can be transmitted to a user through the Internet, and the user can receive the encrypted file without worrying about the data theft. The identification device needs to be physically transported to the user by another way to ensure that only the user can use the encrypted file. The file management information stored in the identification device can control the usage of the encrypted file for avoiding the encrypted file being misused.

Other objectives, advantages and novel features of the invention will be described in details with the accompanying drawings.

DETAILED DESCRIPTION OF THE INVENTION

Figure 1:
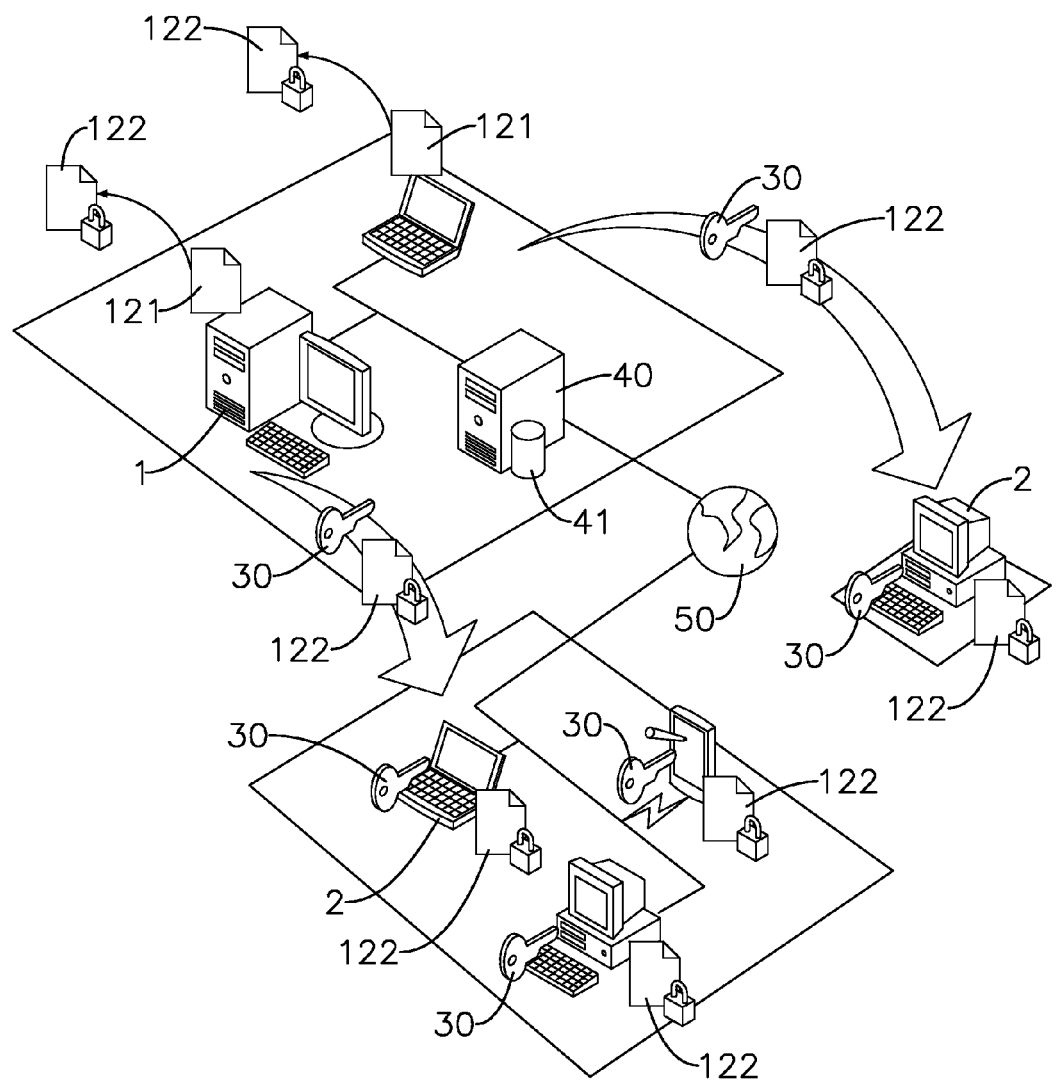
FIG. 1 is a system architecture overview of the present invention.

As shown in FIG. 1, the present invention is a file management system, and the file management system consists of an administration device 1, a supervisory device 2, an identification device 30, and a server 40. The identification device 30 is an electronic device with a storage space. The server 40 has a first storage unit 41 which stored a file control database. As shown in FIG. 1, the administration device 1 and the supervisory device 2 could be a notebook computer, a personal computer, a tablet computer, or a smart phone. The identification device 30 could be a USB flash drive, an eSATA drive, an electronic handset with wireless communication functionality (e.g., Bluetooth, Wi-Fi, or infrared transmission), or an identification card and a card reader for scanning the identification card. For example, the identification card may be a citizen personal certificate, or a personal identification card.

Figure 2:
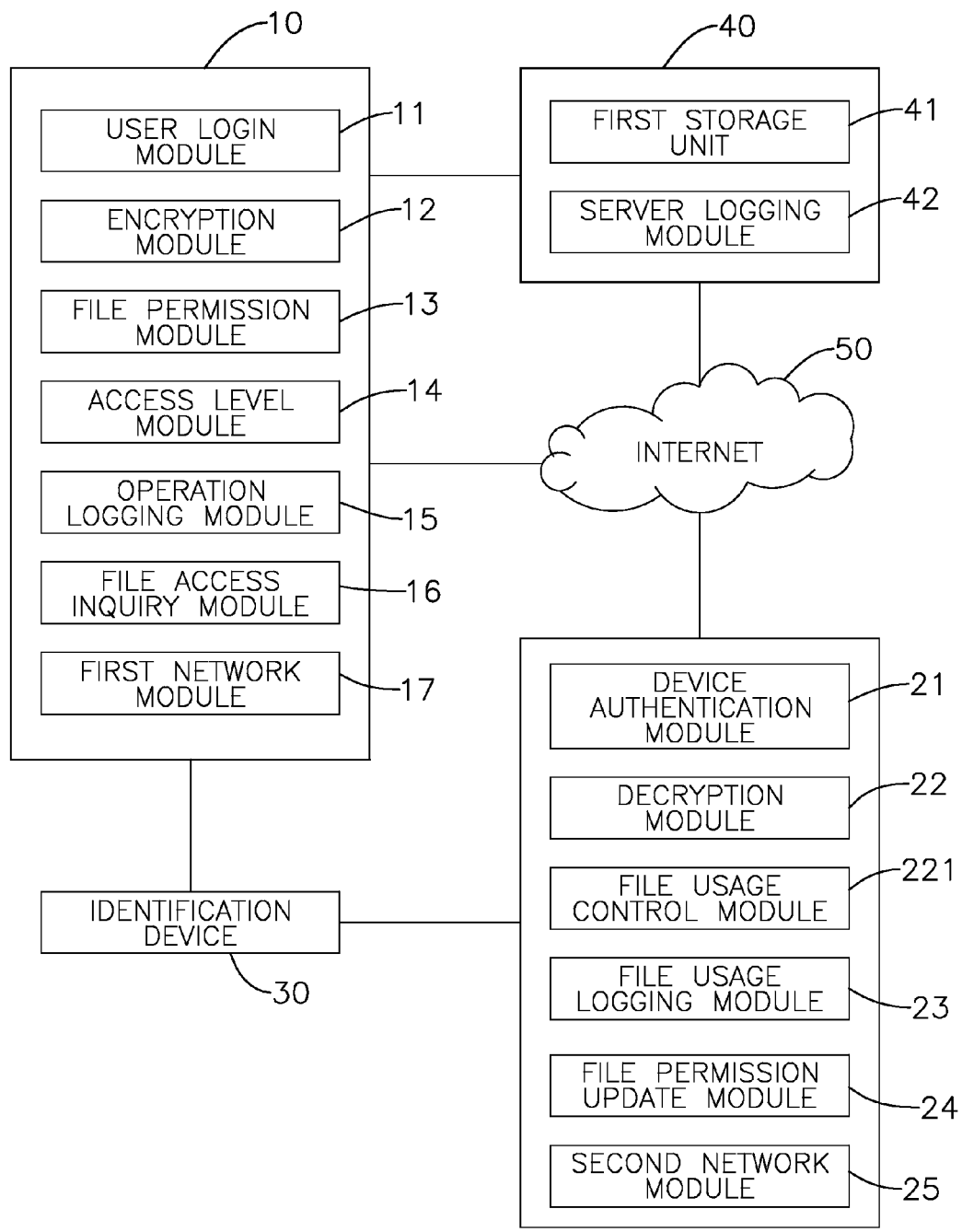
FIG. 2 is a block diagram of the system architecture of the present invention.

With reference to FIG. 2, the administration device 1 comprises a first computing processor 10. The first computing processor 10 comprises a user login module 11, an encryption module 12, a file permission module 13, and a first network module 17. The identification device 30 is electronically connected with the administration device 1 when the administration device 1 is using. Otherwise, while the identification device 30 is disconnected from the administration device 1, the administration device 1 is using up. In the embodiment, the connection interfaces between the identification device 30, the administration device 1, and the supervisory device 2 could be an USB interface, a SATA interface, an eSATA interface, an IEEE1394 interface, a PCMIA interface, a wireless communication interface (e.g., WiFi, Bluetooth, infrared, NFC, ZigBee, or Wireless USB) or a serial port interface (e.g., RS232, RS422, or RS485).

The user login module 11 verifies the correctness of a user identification and the corresponding password. When the user identification and the password are both correct, the user can login the administration device 1 to execute each module of the first computing processor 10 of the administration device 1. Otherwise, while the verification is failed, the user is forbidden to login the administration device 1.

According to an original file 121 and the encryption information, the encryption module 12 can generate an encrypted file 122, and then store the encryption information into the identification device 30. In the embodiment, the encryption information comprises the decryption information of the encrypted file 122 and a digital fingerprint (e.g., Message-Digest 5 (MD5)) of the encrypted file 122, used to control the file usage and access duration.

The file permission module 13 sets a file access control rules and generates a file management information according to the file access control rules. Then, the file permission module 13 stores the file management information into the identification device 30, and transmits the file management information to the server 40 through Internet 50 by the first network module 17. The file management information is also stored in the file control database of the server 40. The file access control rule is used to control the usage of the encrypted file 122. In the embodiment, the file management information includes a user name, a file name of the encrypted file 122, the file access control rules, a link of backing up the original file 121, the digital fingerprint (e.g., MD5), and the establishment time of the file management information.

In the embodiment, the following actions of the file access control rules are included: automatically adding a text or image watermark when using the encrypted file 122; automatically adding a text or image watermark when printing the encrypted file 122; forbidding printing the encrypted file 122; forbidding capturing or picturing a screen while the encrypted file 122 is shown on the screen; forbidding copying or modifying the encrypted file 122; and forbidding transmitting the encrypted file 122 after decrypting. For example, the file access control rules forbid a functionality of cut, copy, and paste, a functionality of drag and drop, a functionality of saving the content as a new file, using a virtual printer to print the encrypted file 122 as an output file. The text or image watermark can prevent malicious users from photographing the content of the encrypted file by another device.

Furthermore, the file access control rules can decide the limited number of times of using the encrypted file 122, an expiration time of using the encrypted file 122, the limited duration of using the encrypted file 122 each time, the limited total time of using the encrypted file 122, the limited number of times of printing the encrypted file 122, the limited duration of using the encrypted file 122 each time via the identification device 30, and the limited total time of using the encrypted file 122 via the identification device 30.

For example, when the limited number of times of using the encrypted file 122 is reached, the encrypted file 122 will be deleted. When the file usage time of using the encrypted file 122 is expired, the encrypted file 122 will be deleted. When the duration of using the encrypted file 122 each time is expired, the encrypted file 122 will be closed. When the total time of using the encrypted file 122 is reached, the encrypted file 122 will be closed. When the number of times of printing the encrypted file 122 is reached, the encrypted file 122 will be deleted. In the embodiment, using a file means to execute, open or access the file.

The first computing processor 10 of the administration device 1 comprises an access level module 14, an operation logging module 15, and a file access inquiry module 16.

The access level module 14 defines a confidential level information included in the encryption information, and the encrypted file 122 has the confidential level information to be more confidential. In practice, when an encrypted file 122 is authorized only for a specific person (e.g., an executive of a company), the confidential level information is required to be included. Therefore, the confidential encrypted file 122 can only be used by the specific and authorized person, and other users cannot use the confidential encrypted file 122.

When the user uses the administration device 1, the operation logging module 15 records user operation histories and generates the operating information. The operation logging module 15 further transmits the operating information to the file control database of the server 40 through the Internet 50 by the first network module 17, and the operating information is stored in the database of the server 40. The system manager can examine the usage of the encrypted file 122 by the operating information. In the embodiment, the operating information includes the user identification, the file operation time, a confidential level information of the encrypted file 122, and the recipient name of the encrypted file 122.

The file usage inquiry module 16 searches the file usage information of the encrypted file 122 to provide the owner of the original file 121 to track the file usage of the encrypted file 122. The file usage inquiry module 16 loads the file usage information from the server 40 or from the identification device 30. In the embodiment, the file usage information comprises a file name of the encrypted file 122, duration of using the encrypted file 122 each time, expiration time of allowing the use of the encrypted file 122, and a number of times of using the encrypted file 122.

The supervisory device 2 includes a second computing processor 20. The second computing processor 20 comprises a device authentication module 21, a decryption module 22, and a file usage control module 221. In order to use the encrypted file 122, the identification device 30 needs to be electronically connected with the supervisory device 2. If the identification device is disconnected, the encrypted file 122 cannot be used anymore.

The device authentication module 21 drives the identification device 30 to load the encryption information and the file management information from the identification device 30.

The decryption module 22 authenticates the encryption information stored in the identification device 30, and the user can use the encrypted file 122 when the encryption information is authorized. When the encryption information is not authorized, the supervisory device 2 forbids accessing the encrypted file 122.

The file usage control module 221 applies the encrypted file 122 according to the file access control rules of the file management information stored in the identification device 30. On the contrary, when the encryption information is not authorized, the supervisory device 2 is forbided using the encrypted file 122. The file usage control module 221 controls the encrypted file 122 according to the file access control rules of the file management information stored in the identification device 30. For example, the file access control module 221 checks whether the expiration time of using the encrypted file 122 is expired or not. The file access control module 221 deletes the encrypted file 122 or forbids accessing the encrypted file 122 when the file is expired. Further, the file access control module 221 may show a reminding screen to inform users.

In addition, while the encrypted file 122 contains the confidential level information, the decryption module 22 further authenticates the encrypted file 122 according to the confidential level information stored in the identification device 30. The confidential encrypted file 122 can be used when the confidential level information is authorized. Accessing to the confidential encrypted file 122 is forbidden when the confidential level information is not authorized.

Further, the second computing processor 20 of the supervisory device 2 comprises a file usage logging module 23, a file permission update module 24, and a second network module 25.

The file usage logging module 23 records the file name of the encrypted file 122, a duration of using the encrypted file 122 each time, the expiration time of forbidding to use the encrypted file 122, and a number of times of using the encrypted file 122 to generate the file usage information. Then, the file usage logging module 23 transmits the file usage information to the file control database of the server through the Internet 50 by the second network module 25 and stored into the file control database of the server. The file usage logging module 23 further stores the file usage information in the identification device 30. When the supervisory device 2 is not connected to the Internet 50, the file usage logging module 23 only stores the file usage information in the identification device 30. As a result, the owner of the original file 121 can load the file usage information stored in the database through the Internet 50, or load the file usage information stored in the identification device 30 to realize the file usage of the encrypted file 122. Further, the supervisory device 2 has a second storage unit (not shown in figures) and the file usage logging module 23 can store the file usage information in the second storage unit with regardless of the supervisory device 2 being connected to the Internet 50 or not. In other words, the file usage logging module 23 records the file usage information in three different locations when the supervisory device 2 is connected to the Internet 50. If the supervisory device 2 is not connected to the Internet 50, the file usage logging module 23 first records the file usage information in two locations. Once the supervisory device 2 is connected to the Internet 50, the file usage information will be synchronized to the file control database of the server and is stored into the file control database of the server.

The file permission update module 24 is connected to the server 40 through the Internet 50 by the second network module 25, and compares the file access control rules in the database of the server 40 with the file access control rules in the identification device 30. When both are not identical, the file permission update module 24 updates the file access control rules in the identification device 30 according to the file access control rules in the database of the server 40.

The identification device 30 can be connected to the administration device 1 or the supervisory device 2, selectively. It is also an electronic storage device which can store the encryption information, the file management information, and, selectively, the file usage information.

The server 40 is electronically connected to the administration device 1, and comprises a first storage unit 41 and a server logging module 42. The first storage unit 41 has a database to store the information related to the file access control and backs up the original file 121. The server logging module 42 generates the server operating information when the administration device 1 transmits the file management information to the database or the supervisory device 2 transmits the file usage information to the database. Simultaneously, the server operating information is stored in the first storage unit 41. In the embodiment, the server operating information contains a user identification of the user who transmits information, the transmission time, and a name of the encrypted file 122.

Figure 3:
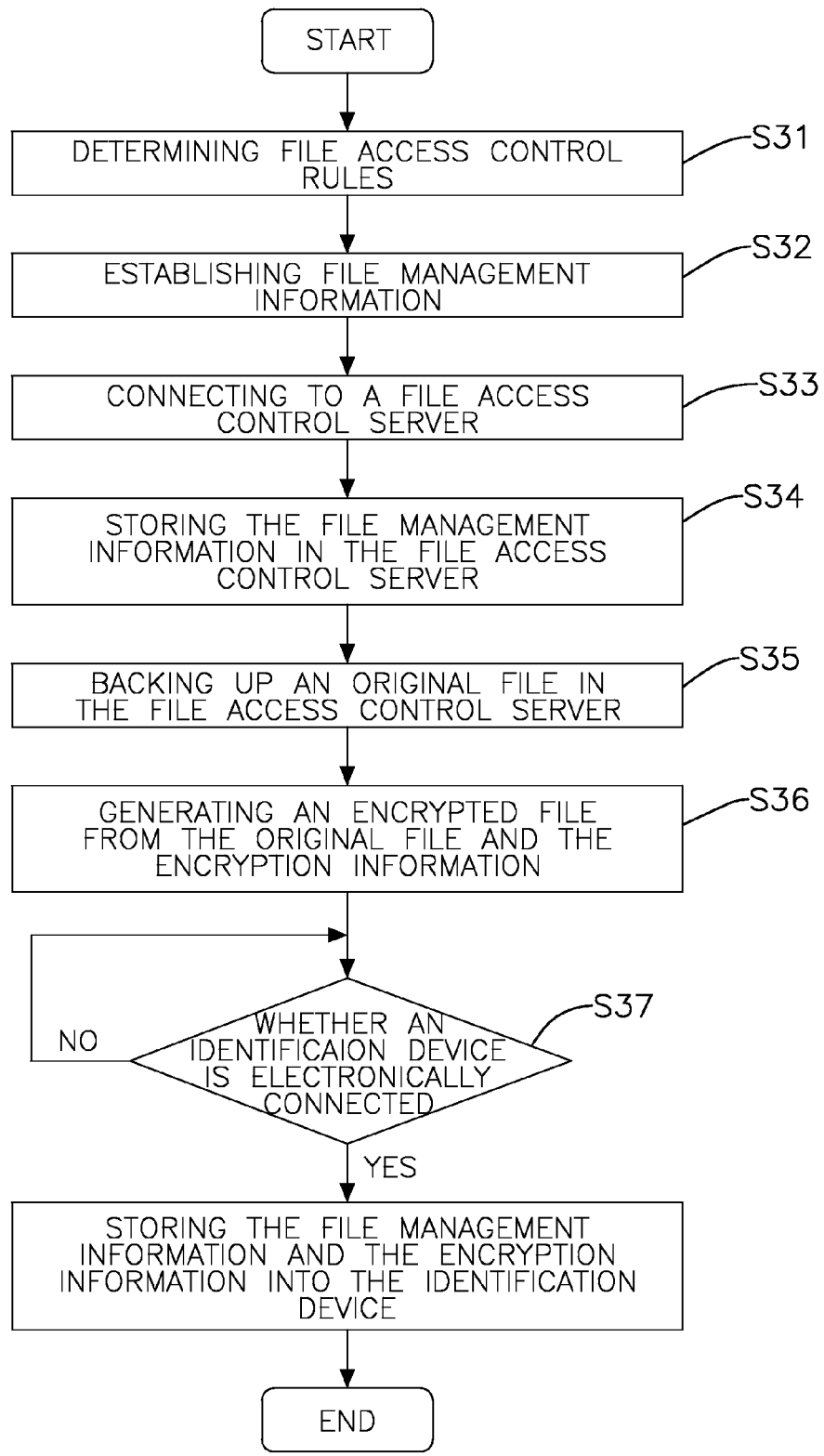
FIG. 3 is a flowchart of the file encryption procedure of the present invention.

With refer to FIG. 3, the file management method comprises a file encryption procedure and a file decryption procedure. The file encryption procedure is executed by the administration device 1, and consists of the following steps:

(1) Determining file access control rules (S31).

(2) Establishing file management information (S32).

(3) Connecting to a file access control server, for example, the server 40 in FIG. 1 (S33).

(4) Storing the file management information in the file access control server (S34).

(5) Backing up an original file 121 in the file access control server (S35).

(6) Generating an encrypted file 122 from the original file 121 and the encryption information (S36).

(7) Determining whether an identification device 30 is electronically connected to the administration device 1 (S37).

(8) When the identification device 30 is electronically connected to the administration device 1, the file management information and the encryption information will be stored into the identification device 30 (S38). Otherwise, the file encryption procedure returns back to the previous step (S37).

Figure 4A:
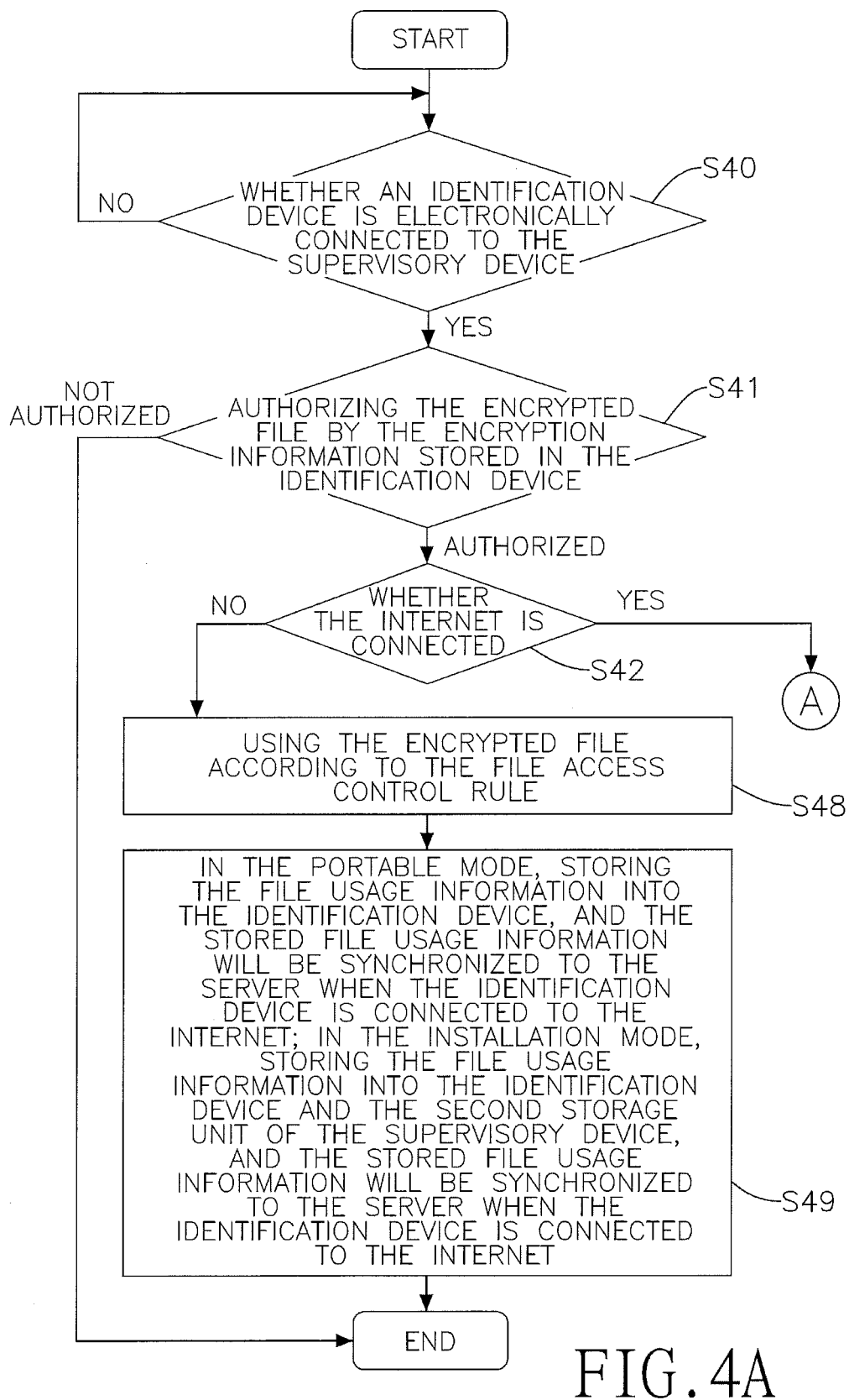
FIGS. 4A and 4B is a flowchart of the file decryption procedure of the present invention.
Figure 4B:
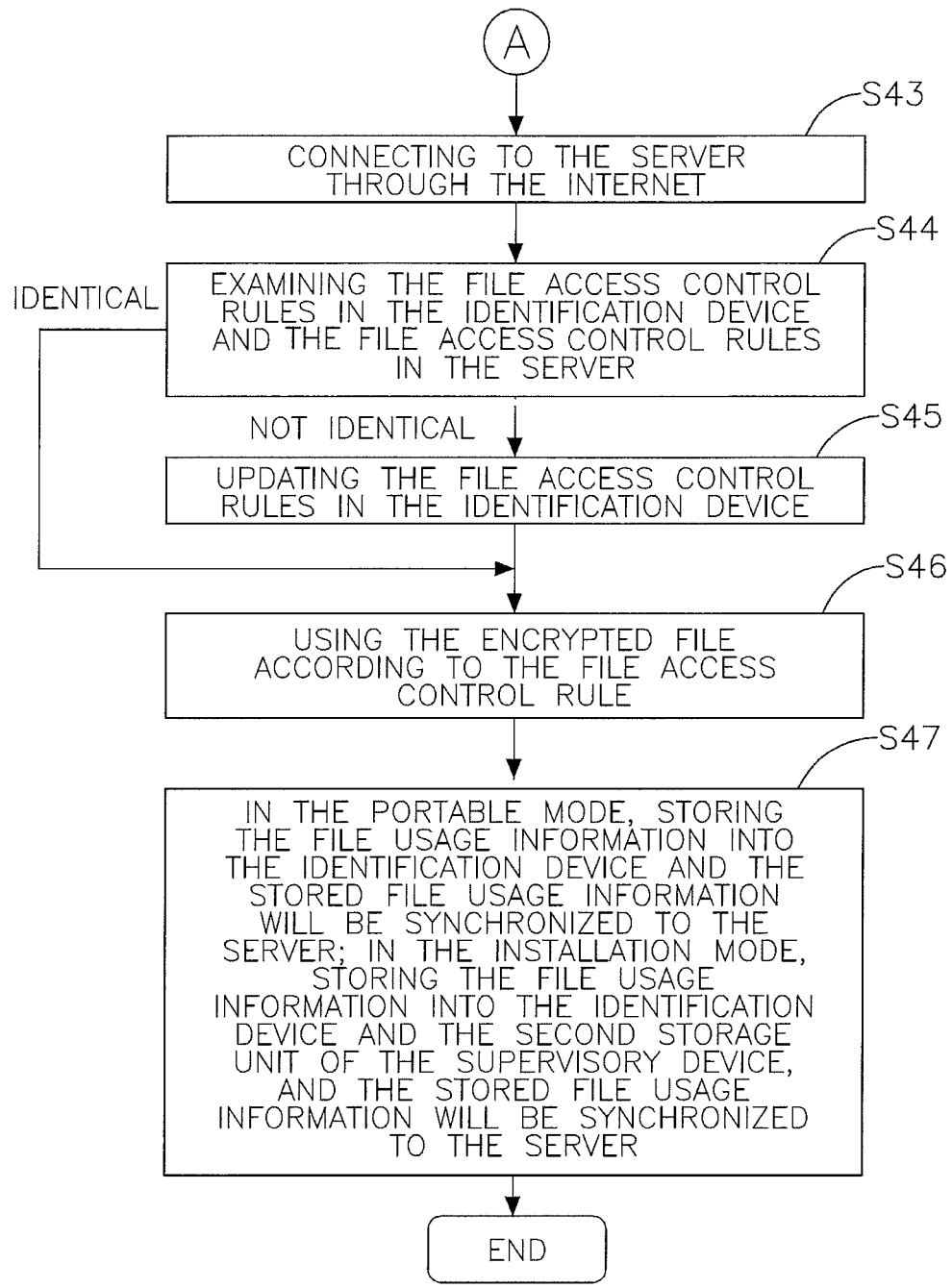

With reference to FIGS. 4A and 4B, the file decryption procedure is executed by the supervisory device 2, and comprises the following steps:

(1) Determining whether an identification device 30 is electronically connected to the supervisory device 2 (S40) or not. If connected, this procedure goes into the next step. If not connected, this procedure returns back to the step (S40).

(2) The encrypted file 122 is authorized by the encryption information stored in the identification device 30 (S41). If the authentication is successful, users can use the encrypted file 122 according to the file access control rules (S48) and stores the file usage information into the identification device 30 (S49). Otherwise, if the encrypted file 122 is not authorized, the file decryption procedure is halt.

Furthermore, in a portable mode of the file decryption procedure, the supervisory device 2 needs to have a second storage unit (not shown in figures), and the file decryption procedure consists of the following steps:

(1) Determining whether the supervisory device 2 is connected to the Internet 50 (S42).

(2) When the supervisory device 2 is not connected to the Internet 50, the encrypted file 122 is used according to the file access control rules in the identification device 30 (S48), and the file usage information is stored into the identification device 30, and the stored file usage information will be synchronized to the server 40 when the identification device 30 is connected to the Internet 50 by the supervisory device 2 (S49).

(3) If the supervisory device 2 is connected to the Internet 50, the supervisory device 2 is going to connect with the server 40 through the Internet 50 (S43). The file access control rules in the identification device 30 are examined with the file access control rules in the server 40 (S44). If both are identical, the file access control rules are not required to be updated. If both are not identical, the file access control rules in the identification device 30 are updated according to the file access control rules in the server 40 (S45). Then, the encrypted file 122 can be used (S46) according to the latest file access control rules, and the file usage information is stored into the identification device 30 and synchronized to the server 40 (S47).

When the file decryption procedure is executed in an installation mode, the file decryption procedure comprises the following steps:

(1) Determining whether the supervisory device 2 is connected to the Internet 50 (S42) or not. If the supervisory device 2 is not connected to the Internet 50, the encrypted file 122 (S48) is used according to the file access control rules in the identification device 30, and the file usage information is saved into the identification device 30 and the second storage unit of the supervisory device 2, and the recorded file usage information will be synchronized to the server 40 when the identification device 30 is connected to the Internet 50 by the supervisory device 2 (S49).

(2) If the supervisory device 2 is connected to the Internet 50, the supervisory device 2 is going to connect with the server 40 through the Internet 50 (S43). The file access control rules in the identification device 30 are examined with that in the server 40 (S44) and are updated if necessary. Then, the encrypted file 122 (S46) can be used according to the latest file access control rules, and the file usage information is stored into and the identification device 30 and synchronized to the server 40 (S47).

In conclusion, the file decryption procedure is executed in the portable mode means that the supervisory device 2 uses the proprietary modules in the identification device 30 to execute the file decryption procedure. In the installation mode, it means that the supervisory device 2 uses the proprietary modules in the second storage unit of the supervisory device 2 to execute the file decryption procedure.

With reference to FIG. 1, when an owner of the original file 121 uses the present invention to generate the encrypted file 122, the owner has to input a user identification and a password to determine whether the administration device 1 can be logged in or not. If it is verified, the owner can define the file access control rules to generate the file management information in order to limit the file usage authority of using the encrypted file 122. The administration device 1 generates an encrypted file 122 according to the original file 121 and the file encryption information. Further, the encryption information and the file management information are saved into the identification device 30 and the original file 121 is backed up on the server 40.

The owner can store the encrypted file 122 into a portable storage device, the identification device 30, and transmits the portable storage device to a user. Then, the user connects the portable storage device to the supervisory device 2 to retrieve the encrypted file 122. Also, the user may use the supervisory device 2 to get the encrypted file 122 through the Internet 50.

The owner can deliver the identification device 30 to the authorized user in person or via the postal service. Therefore, the user can use the identification device 30 to connect with the supervisory device 2 to retrieve the encryption information and the file management information. Then, the supervisory device 2 uses the encryption information and the confidential level information in the identification device 30 to authorize the encrypted file 122. When the authentication is successful, the user can use the encrypted file 122 according to the file management information in the identification device 30. When it is not authorized, the user is forbidden to use the encrypted file 122. Furthermore, as the encrypted file 122 can be accessed, the supervisory device 2 applies the file access control rules, stored in the identification device 30, to the encrypted file 122. For example, the copy of the encrypted file 122 is forbidden, the text or image watermark is embedded in the printing of the encrypted file 122, the usage times of the encrypted file 122 is limited, and the number of printing and the expiration of using the encrypted file 122 are limited.

In the present invention, the encrypted file 122 also can be transmitted to the user through the Internet 50. However, the user needs the identification device 30 to use the encrypted file 122. When the encrypted file 122 is hacked via the file transmission, the cracker cannot use the encrypted file 122 because the identification device 30 is absent. Because the identification device 30 and the encrypted file 122 are separately transmitted to the user, the encrypted file 122 and the identification device 30 may not be stolen at the same time. Even if one of them is stolen, the encrypted file 122 cannot be used by the unauthorized user. Possibility of the encrypted file 122 being hacked will be significantly decreased.

In addition, the owner can control the usage of the encrypted file 122 according to the file management information in the identification device 30. Thus, the encrypted file 122 cannot be copied or printed, and may have an expiration time, and a number of times of using or printing.

Because, in this present invention, each user has the identification device 30, the user will be timely aware of the risk of losing the identification device 30. Thus, probability of the encrypted file 122 being hacked will be decreased.

Even though numerous characteristics and advantages of the present invention have been described in the previous sections and the details of the structures and functionalities of the invention are also prevented, the disclosure is illustrative only and not limited. Changes may be made in detail, especially in matters of shape, size, and arrangement of parts within the principles of the invention to the full extent indicated by the broad general meaning of the terms in which the appended claims are expressed.

What is claimed is:

1. A file management system, comprising:
   an identification device being an electronic device having a storage space;
   an administration device comprising a first computing processor; wherein the first computing processor generates an encrypted file according to an original file and an encryption information, generates a file management information according to a plurality of file access control rules, and further stores the encryption information and the file management information into the identification device; and
   a supervisory device comprising a second computing processor; wherein the second computing processor loads the encryption information and the file management information from the identification device, authenticates the encrypted file by the encryption information of the identification device, access the encrypted file when the encryption information is authorized, and forbids accessing the encrypted file when the encryption information is not authorized;
   wherein the identification device is selectively and electronically connected to the administration device or the supervisory device;
   wherein the file access control rule comprises:
      automatically adding a text or image watermark when printing the encrypted file;
      automatically adding a text or image watermark when using the encrypted file;
      forbidding printing the encrypted file;
      forbidding capturing or picturing a screen while the encrypted file is shown;
      forbidding copying or modifying the encrypted file; and
      forbidding transmitting the encrypted file through the Internet,
   wherein the first computing processor of the administration device comprises:
   an encryption module generating the encrypted file according to the original file and the encryption information, and storing the encryption information into the identification device; and
      a file permission module setting the file access control rules, generating the file management information according to the file access control rules, and storing the file management information into the identification device, and
   wherein the second computing processor of the supervisory device further comprises:
   a device authentication module driving the identification device to load the encryption information and the file management information from the identification device;
   a decryption module authenticating the encrypted file via the encryption information of the identification device, and forbidding accessing the encrypted file when the encryption information of the identification device is not authorized; and
      a file usage control module accessing the encrypted file according to the file access control rules of the file management information stored in the identification device when the encryption information of the identification device is authorized.

2. The file management system as claimed in claim 1, wherein the first computing processor of the administration device further comprises:
a user login module verifying a user identification and a password, logging into the administration device to execute each module of the administration device when the user identification and the password are both correct, and forbidding logging into the administration device when the user identification and the password are incorrect.

3. The file management system as claimed in claim 1, wherein the first computing processor of the administration device further comprises: a user login module verifying a user identification and a password, logging into the administration device to execute each module of the administration device when the user identification and the password are correct, and forbidding logging into the administration device when the user identification and the password are incorrect.

4. The file management system as claimed in claim 1, wherein the second computing processor of the supervisory device further comprises:
a device authentication module driving the identification device to load the encryption information and the file management information from the identification device;
a decryption module authenticating the encrypted file via the encryption information of the identification device, and forbidding accessing the encrypted file when the encryption information of the identification device is not authorized; and
a file usage control module accessing the encrypted file according to the file access control rules of the file management information stored in the identification device when the encryption information of the identification device is authorized.

5. The file management system as claimed in claim 1, wherein the first computing processor of the administration device further comprises:
an access level module defining a confidential level information included in the encryption information.

6. The file management system as claimed in claim 1, wherein the first computing processor of the administration device further comprises: an access level module defining confidential level information included in the encryption information.

7. The file management system as claimed in claim 1, further comprising:
a server comprising a first storage unit, wherein the first storage unit has a database.

8. The file management system as claimed in claim 7, wherein the first computing processor of the administration device further comprises:
a first network module connecting to the server through the Internet; and
an operation logging module generating an operating information, and transmitting the operating information to the database of the server via the first network module.

9. The file management system as claimed in claim 8, wherein the operating information comprises a user identification, a file operation time, and a recipient name of the encrypted file.

10. The file management system as claimed in claim 1, further comprising: a server comprising a first storage unit, wherein the first storage unit has a database.

11. The file management system as claimed in claim 10, wherein the first computing processor of the administration device further comprises:
a first network module connecting to the server through the Internet; and
an operation logging module generating an operating information, and transmitting the operating information to the database of the server via the first network module.

12. The file management system as claimed in claim 11, wherein the operating information comprises a user identification, a file operating time, and a recipient name of the encrypted file.

13. The file management system as claimed in claim 1, wherein the second computing processor of the supervisory device further comprises:
a file usage logging module, generating a file usage information, and storing the file usage information into the identification device.

14. The file management system as claimed in claim 13, wherein the supervisory device further comprises:
a second storage unit, being stored the file usage information via the file usage logging module of the supervisory device.

15. The file management system as claimed in claim 1, wherein the second computing processor of the supervisory device further comprises: a file usage logging module, generating a file usage information, and storing the file usage information into the identification device.

16. The file management system as claimed in claim 15, wherein the supervisory device further comprises:
a second storage unit, being stored the file usage information via the file usage logging module of the supervisory device.

17. The file management system as claimed in claim 7, wherein the second computing processor of the supervisory device further comprises:
a second network module connecting to the server via the Internet; and
a file usage logging module, generating a file usage information, and storing the file usage information into the first storage unit of the server via the second network module.

18. The file management system as claimed in claim 10, wherein the second processor of the supervisory device further comprises:
a second network module connecting to the server through the Internet; and
a file usage logging module, generating file usage information, and storing the file usage information into the first storage unit of the server via the second network module.

19. The file management system as claimed in claim 13, wherein the file usage information comprises a file name of the encrypted file, a duration of using the encrypted file each time, expiration time of allowing the use of the encrypted file, and a number of times of using the encrypted file.

20. The file management system as claimed in claim 13, wherein the first computing processor of the administration device further comprises:
a file usage inquiry module, searching the file usage information from the identification device.

21. The file management system as claimed in claim 15, wherein the file usage information comprises a file name of the encrypted file, a duration of using the encrypted file each time, expiration time of allowing the user of the encrypted file, and a number of times of using the encrypted file.

22. The file management system as claimed in claim 15, wherein the first computing processor of the administration device further comprises:
a file usage inquiry module, searching the file usage information from the identification device.

23. The file management system as claimed in claim 17, wherein the first computing processor of the administration device further comprises:
a file usage inquiry module, searching the file usage information from the identification device.

24. The file management system as claimed in claim 17, wherein the second computing processor of the supervisory device further comprises:
a file permission update module connecting to the server through the Internet, comparing the file access control rules in the database of the server with the file access control rules in the identification device, and updating the file access control rules in the identification device according to the file access control rules in the database of the server when the file access control rules in the database of the server and the file access control rules in the identification device are not identical.

25. The file management system as claimed in claim 18, wherein the first computing processor of the administration device further comprises:
a file usage inquiry module, searching the file usage information from the identification device.

26. The file management system as claimed in claim 18, wherein the second computing processor of the supervisory device further comprises:
a file permission update module connecting to the server through the Internet, comparing the file access control rules in the database of the server with the file access control rules in the identification device, and updating the file access control rules in the identification device according to the file access control rules in the database of the server when the file access control rules in the database of the server and the file access control rules in the identification device are not identical.

27. The file management system as claimed in claim 1, wherein the file management information comprises a user name, a file name of the encrypted file, the file access control rules, a link of backing up the original file, a digital fingerprint, and the establishment time of the file management information.

28. The file management system as claimed in claim 1, wherein the file management information comprises a user name, a file name of the encrypted file, the file access control rules, a link of backing up the original file, a digital fingerprint, and the establishment time of the file management information.

29. The file management system as claimed in claim 1, wherein the file access rule further comprises:
determining a limited number of times of using the encrypted file;
determining an expiration time of using the encrypted file;
determining a limited duration of using the encrypted file each time;
determining a limited total usage time of using the encrypted file;
determining a limited number of times of printing the encrypted file;
determining a limited duration of using the encrypted file each time via the identification device; and
determining a limited total time of using the encrypted file via the identification device.

30. The file management system as claimed in claim 1, wherein the file access rule further comprises: determining a limited number of times of using the encrypted file; determining an expiration time of using the encrypted file; determining a limited duration of using the encrypted file each time; determining a limited total usage time of using the encrypted file; determining a limited number of times of printing the encrypted file; determining a limited duration of using the encrypted file each time via the identification device; and determining a limited total time of using the encrypted file via the identification device.

31. The file management system as claimed in claim 1, wherein the identification device is a USB flash drive, an eSATA drive, or an electronic device with functionalities of a wireless communication.

32. The file management system as claimed in claim 1, wherein a connection interface between the identification device, the administration device and the supervisory device is an USB interface, a SATA interface, an eSATA interface, an IEEE1394 interface, a PCMIA interface, a wireless communicating interface, or a serial port interface.

33. The file management system as claimed in claim 1, wherein the encryption information comprises the decryption information of the encrypted file and a digital fingerprint of the encrypted file to control the file access duration.

34. A file management method, comprising a file encryption procedure and a file decryption procedure;
wherein the file encryption procedure comprises the following steps:
determining a file access control rules;
establishing a file management information;
generating an encrypted file from an original file and an encryption information;
determining whether an identification device is electronically connected;
when the identification device is not electronically connected, returning to the step of determining whether the identification device is electronically connected; and
when the identification device is electronically connected, storing the file management information and the encryption information into the identification device; and
wherein the file decryption procedure comprises the following steps:
determining whether the identification device is electronically connected;
when the identification device is not electronically connected, returning to the step of determining whether the identification device is electronically connected;
when the identification device is electronically connected, authenticating the encrypted file by the encryption information stored in the identification device;
when the encrypted file is authorized, accessing the encrypted file, and storing a file usage information into the identification device;
when the encryption information is not authorized, halting the file decryption procedure;
wherein the file access control rule comprises:
automatically adding a text or image watermark when printing the encrypted file;
automatically adding a text or image watermark when using the encrypted file;

forbidding printing the encrypted file;
forbidding capturing or picturing a screen while the encrypted file is shown;
forbidding copying or modifying the encrypted file; and
forbidding transmitting the encrypted file through the Internet,
wherein a first computing processor of an administration device comprises:
an encryption module generating the encrypted file according to the original file and the encryption information, and storing the encryption information into the identification device; and
  a file permission module setting the file access control rules, generating the file management information according to the file access control rules, and storing the file management information into the identification device, and
wherein a second computing processor of a supervisory device further comprises:
a device authentication module driving the identification device to load the encryption information and the file management information from the identification device;
a decryption module authenticating the encrypted file via the encryption information of the identification device, and forbidding accessing the encrypted file when the encryption information of the identification device is not authorized; and
  a file usage control module accessing the encrypted file according to the file access control rules of the file management information stored in the identification device when the encryption information of the identification device is authorized.

35. The file management method as claimed in claim 34, wherein the file encryption procedure further comprises the following steps:
connecting to a server;
storing the file management information into the server;
backing up the original file in the server.

36. The file management method as claimed in claim 34, wherein the file decryption procedure is executed in a portable mode and further comprises the following steps:
determining whether the Internet is connected;
when the Internet is not connected, using the encrypted file according to the file access control rules in the identification device, storing the file usage information into the identification device, and the stored file usage information will be synchronized to the server when the identification device is connected to the Internet by the supervisory device;
when the Internet is connected, connecting to the server through the Internet, and comparing the file access control rules in the server with the file access control rules in the identification device;
when the file access control rules in the server and the file access control rules in the identification device are not identical, updating the file access control rules in the identification device according to the file access control rules in the server, using the encrypted file according to the file access control rules, and storing the file usage information into the server and the identification device;
when the file access control rules in the server and the file access control rules in the identification device are identical, using the encrypted file according to the file access control rules, and storing the file usage information into the server and the identification device.

37. The file management method as claimed in claim 34, wherein the file decryption procedure is executed in an installation mode by a supervisory device, and further comprises the following steps:
determining whether the Internet is connected;
when the Internet is not connected, using the encrypted file according to the file access control rules in the identification device, storing the file usage information into the identification device and a second storage unit of the supervisory device, and the stored file usage information will be synchronized to the server when the identification device is connected to the Internet by the supervisory device;
when the Internet is connected, connecting to the server through the Internet, and comparing the file access control rules in the server with the file access control rules in the identification device;
when the file access control rules in the server and the file access control rules in the identification device are not identical, updating the file access control rules in the identification device according to the file access control rules in the server, using the encrypted file according to the file access control rules, and storing the file usage information into the server, the identification device, and the second storage unit of the supervisory device;
when the file access control rules in the server and the file access control rules in the identification device are identical, using the encrypted file according to the file access control rules, and storing the file usage information into the server, the identification device, and the second storage unit.

* * * * *